United States Patent
Kolbe et al.

(10) Patent No.: US 10,498,152 B2
(45) Date of Patent: Dec. 3, 2019

(54) METHOD FOR THE REFORMATION OF AN ELECTROLYTIC CAPACITOR IN A CONVERTER AND CONVERTER WITH SUCH

(71) Applicant: GE Energy Power Conversion Technology Ltd, Rugby, Warwickshire (GB)

(72) Inventors: Thomas Kolbe, Berlin (DE); Christian Bernhard Keller, Berlin (DE)

(73) Assignee: GE ENERGY POWER CONVERSION TECHNOLOGY LTD, Warwickshire (GB)

( * ) Notice: Subject to any disclaimer, the term of this patent is extended or adjusted under 35 U.S.C. 154(b) by 153 days.

(21) Appl. No.: 15/705,336

(22) Filed: Sep. 15, 2017

(65) Prior Publication Data
US 2018/0076642 A1 Mar. 15, 2018

(30) Foreign Application Priority Data

Sep. 15, 2016 (DE) .......................... 10 2016 117 379

(51) Int. Cl.
*H02J 7/00* (2006.01)
*H02J 3/38* (2006.01)
(Continued)

(52) U.S. Cl.
CPC ............ *H02J 7/0052* (2013.01); *H01G 11/20* (2013.01); *H02J 3/386* (2013.01); *H02M 5/458* (2013.01);
(Continued)

(58) Field of Classification Search
CPC .......... H02J 7/0052; H02J 3/386; H02J 7/345; H01G 11/20; H02M 5/458; H02M 5/4585; Y02E 60/13
(Continued)

(56) References Cited

U.S. PATENT DOCUMENTS

2010/0080022 A1* 4/2010 Schmidt ................ H02M 7/062
363/53
2012/0099347 A1 4/2012 Pasuri et al.
(Continued)

FOREIGN PATENT DOCUMENTS

DE 10 2004 036 211 A1 3/2006
DE 10 2008 060 546 B3 4/2010
(Continued)

OTHER PUBLICATIONS

Mari, H., "ABB Drives Capacitor Reforming Inspection Instruction," Orange, 3AFE 6873 5190, Approved/Davidsainen Janne, Guide for Capacitor Reforming in ACS50, ACS55, ACS150, ACS310, ACS350, ACS355, ACS550, ACH550 and R1-R4 OINT-/SINT-boards, pp. 1-5 (May 5, 2010).

(Continued)

Primary Examiner — Carlos Amaya
(74) Attorney, Agent, or Firm — Wood IP LLC (57) ABSTRACT

A precharging circuit for precharging an intermediate circuit capacitor of a converter formed from at least one electrolytic capacitor using a grid current from a supply grid before the converter is connected to the supply grid and is used for the reformation of at least one electrolytic capacitor of the intermediate circuit capacitor. A method is provided for the reformation of an intermediate circuit capacitor of a converter formed from at least one electrolytic capacitor, which is connected to the supply grid using a precharging circuit. A converter is created for converting an AC grid voltage into a direct voltage or vice versa, with a device for the reformation of electrolytic capacitors of an intermediate circuit capacitor of the converter using an integrated precharging circuit of the converter. Existing hardware can be used for the reformation of electrolytic capacitors in a converter, and the expense associated with the reformation can be minimized.

20 Claims, 6 Drawing Sheets

(51) Int. Cl.
  *H02M 5/458* (2006.01)
  *H01G 11/20* (2013.01)
  *H02J 7/34* (2006.01)
(52) U.S. Cl.
  CPC .......... *H02M 5/4585* (2013.01); *H02J 7/345* (2013.01); *Y02E 60/13* (2013.01)
(58) Field of Classification Search
  USPC .......................................... 307/109
  See application file for complete search history.

(56) References Cited

U.S. PATENT DOCUMENTS

2013/0313826 A1* 11/2013 Gupta .................... H02H 7/065
    290/44
2015/0326065 A1   11/2015 Schaedlich

FOREIGN PATENT DOCUMENTS

| | | |
|---|---|---|
| DE | 10 2012 223 798 A1 | 6/2013 |
| DE | 10 2012 222 928 A1 | 6/2014 |
| EP | 1 494 343 A2 | 1/2005 |
| EP | 2 523 334 A1 | 11/2012 |
| WO | 2007/025057 A2 | 3/2007 |
| WO | 2010/063453 A1 | 6/2010 |

OTHER PUBLICATIONS

Office Action issued in connection with corresponding DE Application No. 102016117379.7 dated Jul. 27, 2017.
Extended European Search Report and Opinion issued in connection with corresponding EP Application No. 17190356.0 dated Feb. 6, 2018.

* cited by examiner

METHOD FOR THE REFORMATION OF AN ELECTROLYTIC CAPACITOR IN A CONVERTER AND CONVERTER WITH SUCH

BACKGROUND OF THE INVENTION

The present invention relates to a method for the reformation of an intermediate circuit capacitor of a converter formed from at least one electrolytic capacitor and an associated converter for converting an AC grid voltage to a direct voltage or vice versa.

Converters for converting alternating current to direct current and vice versa are used in many applications, for example, for coupling electrical grids with variable-speed drives, for energy exchange between two electrical grids, for photovoltaic and wind power plants and the like. To do this, power converters in different circuit topologies and configurations for different power and voltage ranges are known. In the medium-voltage and high-voltage range, multipoint converters are increasingly used, which have a circuit arrangement with controllable switching elements, preferably power semiconductor switches, which can be clocked at high frequencies to generate a plurality of voltage levels and handle higher voltages than the blocking capability of a single power semiconductor switch permits.

Some converters on the DC voltage side comprise a so-called DC voltage intermediate circuit with an intermediate circuit capacitor arranged therein. In frequency converters to supply power to drive motors or wind power generators, such an intermediate circuit capacitor is arranged between the grid-side rectifier and the load-side inverter and connected in parallel.

In many applications, the capacity of the intermediate circuit capacitor is substantial. In the case of some very high intermediate circuit voltages in the range of several hundred volts, series connections and/or parallel connections of capacitors, preferably electrolytic capacitors, are generally used to provide the required dielectric strength and to be able to store large charge quantities. Such series and/or parallel connections of electrolytic capacitors are referred to herein as the "intermediate circuit capacitor" in the same manner as a single capacitor.

Electrolytic capacitors are polarized capacitors whose anode electrode is made of a metal, in the case of aluminum electrolytic capacitors, for example, aluminum, to which an oxide layer is applied electrochemically as insulating layer, which forms the dielectric medium of the capacitor. The electrolyte is the cathode of the electrolytic capacitor. The quality of the oxide, that changes repeatedly in the course of the electrolytic capacitor production and subsequent use, determines the insulating properties of the dielectric medium. With prolonged storage of electrolytic capacitors in voltage-free condition, especially at elevated temperatures, or due to aging, the oxide degenerates, so that its DC conductivity increases. During recommissioning after non-use, the residual current, which flows as a leakage current through the capacitor, may be relatively high shortly after applying a direct voltage. In applications for converters, a very high residual current can lead to the destruction of the electrolytic capacitors of the intermediate circuit capacitor. To prevent this and minimize the interfering conductivity of the dielectric medium, it is necessary to repeat the forming process under voltage in order to repair the electrolytic capacitors after prolonged non-use and build up the oxide layer again. The repetition of the forming process is referred to herein as reformation or reforming.

To reform the electrolytic capacitors in converters, it is known to slowly ramp up the intermediate circuit of the converter with, for example, an adjustable DC voltage source to a desired reformation voltage. To do so, a technician must connect the voltage source via a special reformation device directly to the intermediate circuit and, for example, slowly adjust it upward according to the specifications of the manufacturers of the electrolytic capacitors. To this end, the converter module must be disconnected from all possible energy sources, in particular from a supply grid, which may optionally require measures from a control center. Furthermore, the technician must ensure by measuring that the converter is in fact switched off, i.e. is currentless and potential-free at the accessible connections. Furthermore, the technician must ensure that the DC voltage intermediate circuit capacitor is discharged before connecting the reformation device to the DC voltage intermediate circuit. For this purpose, physical or electrical access to the DC voltage intermediate circuit conductors is required. The reformation device must also be connected to an auxiliary voltage source of the converter system or must have its own DC voltage supply.

The reformation process can only be started when all the above measures have been taken. The reformation requires the use of highly qualified, trained personnel, and is time-consuming, costly and prone to human error. Due to the possibility of human errors, it presents a risk to human health of the maintenance staff and the proper functioning of the system.

Converters with an intermediate circuit capacitor of high capacitance cannot be connected to the grid without taking special measures, since the switch-on current could be excessively high. Such a switch-on current surge could damage or destroy the converter and the intermediate circuit capacitor. In case of adverse circuit impedances, too high a voltage can arise in the intermediate circuit capacitor, and adverse repercussions of the switch-on current surge on the supplying grid are possible.

BRIEF DESCRIPTION OF THE INVENTION

To prevent this, converters, in particular frequency converters, usually comprise a precharging circuit for the intermediate circuit capacitor. A precharging circuit for the converter known from practice essentially comprises a switching device, a precharging resistor and an uncontrolled rectifier, which are arranged in series with each other on a current path between the supply grid and the intermediate circuit capacitor. The rectifier can be an uncontrolled rectifier whose converter valves are diodes connected similar to a Graetz bridge. The contacts on the AC voltage side of the switching device are connected to the supply grid. The output of the rectifier is connected to the DC voltage intermediate circuit. By closing the switching device of the precharging circuit, the intermediate circuit capacitor can be charged up slowly to the desired nominal voltage, whereby the precharging resistor in the current path limits the charging current. As soon as the intermediate circuit capacitor has been charged sufficiently, the switching device of the precharging circuit can be disconnected and the converter connected to the supply grid via a contactor so that the converter-powered intermediate circuit capacitor is now directly on the supplying grid. Then, the normal converter operation can be taken up.

On this basis, it is a task of the invention to create a method for the reformation of an intermediate circuit capacitor of a converter formed from at least one electrolytic capacitor, which is simple and inexpensive and prevents or overcomes many of the above-mentioned disadvantages and shortcomings of conventional reformation methods for electrolytic capacitors in converters. In particular, it is a task of an embodiment of the invention to create such a reformation method which is less prone to errors and reduces the risk of human error and the associated risks.

A further task of an embodiment the invention is to create a converter comprising such an implemented method.

To solve these and other tasks, a method is created for the reformation of an intermediate circuit capacitor of a converter formed from at least one electrolytic capacitor which is connected to a supply grid, providing a precharging circuit for the converter, which is configured to precharge the intermediate circuit capacitor of the converter using a grid current of the supply grid before the converter is connected to the supply grid, wherein said precharging circuit comprises a switching device in a current path between the supply grid and the intermediate circuit capacitor; receiving a request for the reformation of the intermediate circuit capacitor; and switching the switching device to a closed state to allow a reformation current to flow from the supply grid through the closed switching device and the current path to the intermediate circuit capacitor in order to reform it via the precharging circuit. Using a precharging circuit for a converter configured to precharge an intermediate circuit capacitor of the converter formed from at least one electrolytic capacitor using a grid current from a supply grid before the converter is connected to the supply grid for the reformation of at least one electrolytic capacitor of the intermediate circuit capacitor. Additionally using a converter for converting an AC grid voltage into a direct voltage or vice versa a circuit arrangement with controllable switching elements; a DC voltage intermediate circuit arranged on the DC voltage side of the circuit and connected in parallel with it, wherein the DC voltage intermediate circuit comprises an intermediate circuit capacitor formed by one electrolytic capacitor or a plurality of interconnected electrolytic capacitors; a precharging circuit configured to precharge the intermediate circuit capacitor of the converter using a grid current of the supply grid before the converter is connected to the supply grid, wherein said precharging circuit comprises a switching device in a current path between the supply grid and the intermediate circuit capacitor; and a control device for controlling the operation of the converter depending on the operating conditions. Advantageous embodiments of the invention are the subject matter of the dependent claims.

According to a first aspect of the invention, a method is created for the reformation of an intermediate circuit capacitor of a converter formed from at least one electrolytic capacitor, which is connected to a supply grid. The method comprises the provision of a precharging circuit for the converter, which is configured to precharge the intermediate circuit capacitor of the converter using a grid current of the supply grid, before the converter is connected to a supply grid. The precharging circuit comprises a switching device on a current path between the supply grid and the intermediate circuit capacitor. The method further comprises a receipt of a request for the reformation of the intermediate circuit capacitor. The method also comprises the switching of the switching device to a closed state on the receipt of the request for the reformation in order to allow a reformation current to flow from the supply grid through the closed switching device and the current path to the intermediate circuit capacitor in order to reform the intermediate circuit capacitor via the precharging circuit.

According to embodiments of the invention, the already existing precharging circuit for the converter, in particular frequency converters, is thus used, if required, to reform the electrolytic capacitor(s) which form the intermediate circuit capacitor of the converter. Existing converters that comprise the precharging circuit can be supplemented by a software module for the reformation of the intermediate circuit capacitor, which otherwise uses the existing hardware to precharge the intermediate circuit capacitor to also achieve a reformation of the same. With new converters, a single such precharging and reformation circuit can serve both purposes. Reformation with simple means can be performed quickly and easily. The need for human operation, in particular the use of qualified personnel, can be significantly reduced or even eliminated, with the advantage that the associated risks to the maintenance staff and/or the system are reduced or even eliminated. Also, the maintenance staff does not have to access the intermediate circuit capacitor lines. Many of the protection measures required for conventional reformation processes for electrolytic capacitors of converters can be omitted.

A reformation process would have to be initiated depending on the fulfillment of one or more conditions, e.g. when using the intermediate circuit capacitor after exceeding a specified storage period or non-use of the converter device. Other possible criteria for initiating a reformation process, such as a direct or indirect evaluation of the level of the leakage current, can be used in addition or as a sole criterion.

In one embodiment of the invention, the provision of a precharging circuit can comprise the provision of a precharging circuit that further comprises a precharging resistor, which is connected in series to the switching device on the current path between the supply grid and the intermediate circuit capacitor, wherein, during the reformation, the precharging resistor limits a current flow through the current path to the intermediate circuit capacitor. The precharging resistor can also be used as a reformation resistor to suitably predetermine the reformation current and the reformation voltage. The precharging and reformation circuit is designed at low cost and comprises only a few cost-efficient components.

The precharging circuit, an embodiment also comprises a rectifier circuit to convert the AC grid voltage to a direct voltage, wherein the amount of the AC grid voltage, the control factor of the switching device as well as the leakage current of the electrolytic capacitor(s) to be reformed determine the reformation voltage for the capacitors during the reformation. The rectifier circuit is an uncontrolled rectifier circuit, for example, based on a Graetz circuit, which gives a slightly pulsating DC output voltage. A controlled rectifier circuit could also be used, but is more complex and more costly in implementation and in operation.

In embodiments of the method from among any of those mentioned above, the receipt of a request for the reformation of the intermediate circuit capacitor comprises a receipt of a system-internal request signal triggered by an internal control device that is emitted when the control device detects conditions which are a necessary requirement for a reformation of the intermediate circuit capacitor. Thereupon, the control device can start the reformation process automatically, i.e. is self-activating, without the user's intervention. The internal system software of the converter, in particular the control software, thus notifies when a reformation is necessary and triggers it when necessary.

The detection of conditions that indicate a need for a reformation of the intermediate circuit capacitor can, in particular, comprise that it is determined when the intermediate circuit capacitor has received no power for a period of time that exceeds a predetermined first period of time. If the intermediate circuit capacitor has not been charged for a longer period of time, for example, because the converter was inactive for a prolonged time, this can indicate the need for a reformation. The predetermined first period of time depends on the respective electrolytic capacitor, and can be in the range of some weeks or months. The duration of the inactive time of the converter can be determined and stored in a data storage associated with the system software, to be used when examining the need for a reformation.

Alternatively or additionally, the detection of conditions that indicate a need for a reformation of the intermediate circuit capacitor can comprise that it is detected when at least one of the electrolytic capacitors forming the intermediate circuit capacitor has been replaced. An exchange of the electrolytic capacitor can be recognized automatically by the system, for example, by the system software querying a circuit board carrying the electrolytic capacitors. A maintenance technician can also note the exchange of one or a plurality of electrolytic capacitors by setting an appropriate parameter in the database or software of the system of the converter, so that the system software subsequently detects that a reformation is necessary.

In a further alternative or in addition, the detection of conditions that indicate a need for a reformation of the intermediate circuit capacitor can comprise that it is determined that a precharging process for precharging the intermediate circuit capacitor by means of the precharging circuit is not completed within a period of time, which exceeds a predetermined second period of time. An excessive duration of the precharging process can indicate that the leakage current of the intermediate circuit capacitor is too high, and therefore a reformation is necessary. The second period of time can be determined empirically depending on the electrolyte capacitors and the precharging parameters used.

In other embodiments of the method according to the invention, the receipt of a request for the reformation of the intermediate circuit capacitor can comprise a receipt of an external request signal triggered by an operator. For example, a maintenance technician can start a reformation process after replacing one or a plurality of electrolytic capacitors or carrying out maintenance or servicing work. The reformation process as such is subsequently performed and controlled by the control device of the converter without further intervention by the operator.

In the method from among any of those mentioned above, the reformation process can be controlled taking into account a specification or recommendation provided by the respective manufacturer of the at least one electrolytic capacitor forming the intermediate circuit capacitor. These manufacturer's specifications and recommendations on the reformation current, the reforming times and characteristic curves can be stored in the system software or in an internal database of the converter, which can be accessed by the software or control, similarly to a lookup table, sorted by manufacturer, electrolytic capacitor type or the like, and used for the reformation process. Different manufacturers and electrolytic capacitor types can be taken into account. In simplified embodiments, only the reformation specifications or recommendations of the individual electrolytic capacitor type used in the respective converter are stored.

To meet the specifications of the manufacturer of electrolytic capacitors, the switching device of the precharging and reformation circuit during the reformation process can be clocked so that, on average, a desired reformation voltage on the intermediate circuit capacitor and/or a desired reformation current on the intermediate circuit capacitor results or result. The switching device can, for example, be switched on and off with pulse-width modulation with a predefined or varying clock ratio to achieve an average reformation voltage or an average reformation current which is less than the maximum permissible reformation voltage or the maximum permissible reformation current according to the manufacturer's specifications. Alternatively, a standard reformation process with a fixed clock ratio of the switching device or with a permanently switched-on switching device can be performed, regardless of the electrolytic capacitor type or manufacturer.

In a further development of the method mentioned previously, the switching device can be clocked so that an average reformation voltage applied to the intermediate circuit capacitor follows a given reformation curve or characteristic curve. This reformation curve is usually dependent on the capacitor manufacturer and type, the storage time and the storage temperature. The applied average reformation voltage can be increased gradually in embodiments to take into account the increasing regeneration of the oxide layer of the electrolytic capacitor and the increasing charge of the same.

In a further development of the method mentioned above, the switching device is clocked so that a medium reformation voltage applied to the intermediate circuit capacitor is increased gradually, wherein, between each number of cycle times within one voltage level and/or between successive voltage levels of the medium reformation voltage, the switching device is switched off for a predetermined period of time to interrupt a reformation current to the intermediate circuit capacitor. The reformation process is thus carried out intermittently, with an increasing reformation voltage. Such breaks in the reformation process allow the electrolytic capacitors to discharge slightly, via the leakage current, and can be used to estimate the leakage current and the progress of the reformation.

If, during the reformation process, the intermediate circuit voltage is detected via the intermediate circuit capacitor and/or the grid voltage of the supply grid, the reformation progress can be monitored or controlled. The reformation process can then be optimized as required, depending on the actual operating conditions. In principle, the leakage current of the intermediate circuit capacitor could also be measured directly, which may be expensive.

The reformation process can also be used to detect a defect in the intermediate circuit capacitor, the converter or the precharging circuit. If, for example, it is found that the reformation process takes longer than a predefinable third period of time or the intermediate circuit voltage via the intermediate circuit capacitor is insufficient or does not increase sufficiently fast, this can be that indicate a hardware fault, and the reformation process can be aborted. Subsequently, an error message, for example, an optical or acoustic signal indicator on the converter system, can be output or transmitted to a remote center. In the event of a fault, measures can be taken to prevent the operation of the converter, in particular when connecting the converter to the supply grid.

Otherwise, if it is determined that the reforming process of the electrolytic capacitor has been completed successfully, the switching device of the precharging circuit can be converted to an open state, in order to effectively disconnect the latter from the supply grid. After that, by closing a line disconnector, the converter can be connected to the supply grid.

Optionally, after determining a successfully completed reformation process and before connecting the converter to the supply grid, in an embodiment automatically, a precharging process for the intermediate circuit capacitor can be performed. Thereby, the intermediate circuit capacitor can be charged to the required nominal voltage for the operation of the converter. The precharging process can also be triggered by an operator, for example by a maintenance technician.

In applications of the method according to the invention, the converter is a frequency converter configured to exchange electrical energy between an AC voltage supply grid and an electrical machine. The electrical machine can be operated either as a motor or as a generator. Accordingly, the exchange of the electrical energy can occur either from the grid to the machine or vice versa. In particular applications, the method is used for a frequency converter which supplies a wind power plant generator.

Another aspect of the invention provides a use of a precharging circuit for a converter, which is configured to precharge an intermediate circuit capacitor of the converter formed from at least one electrolytic capacitor by using a grid current from a supply grid before the converter is connected to the supply grid for the reformation of at least one electrolytic capacitor of the intermediate circuit capacitor. The embodiments and advantages of using the precharging circuit for the reformation process according to the invention can correspond to the embodiments and advantages of the reformation process according to the invention as described above.

According to a further aspect of the invention, a modular multilevel converter is provided for converting an AC grid voltage to a direct voltage and/or vice versa. The converter comprises a circuit arrangement with controllable switching elements, in an embodiment a power semiconductor switches, a DC voltage intermediate circuit, a precharging circuit and a control device. The DC voltage intermediate circuit is arranged on the DC voltage side of the circuit and connected in parallel with it, wherein the DC voltage intermediate circuit comprises an intermediate circuit capacitor formed by one or a plurality of interconnected electrolytic capacitors. The precharging circuit is configured to precharge the intermediate circuit capacitor of the converter using a grid current of the supply grid, before the converter is connected to the supply grid. The precharging circuit comprises a switching device on a current path between the supply grid and the intermediate circuit capacitor. The control device is used to control the operation of the converter depending on the detected operating conditions, wherein said control device is configured to perform a reformation process as described above. The converter may comprise the further developments and advantages mentioned above in connection with the reformation process.

A converter of an embodiment is a frequency converter for operating an electrical machine in an electrical supply grid, comprising a rectifier unit and an inverter unit, which are coupled to each other via the DC voltage intermediate circuit with the intermediate circuit capacitor. In embodiments, the frequency converter is configured for use in a wind power plant to supply a wind power plant generator. Such frequency converters may already comprise a precharging circuit, as described above, which can be used to implement a reformation process for the electrolytic capacitors, which is simple, cost-effective and safe to use for personnel and the system. Existing converter systems can easily be retrofitted with the necessary control software to implement the reformation method. In new frequency converters, a precharging process as well as a reformation process can be implemented with a single hardware device.

BRIEF DESCRIPTION OF THE DRAWINGS

Further advantageous details of embodiments of the invention result from the subordinate claims, the drawing and the associated description. An embodiment described in more detail below with reference to a drawing, which shows exemplary but by no means limiting embodiments of the invention, wherein the same reference signs are used in all figures to indicate the same elements. In detail, the drawings are as follows:

DETAILED DESCRIPTION OF THE INVENTION

Figure 1:
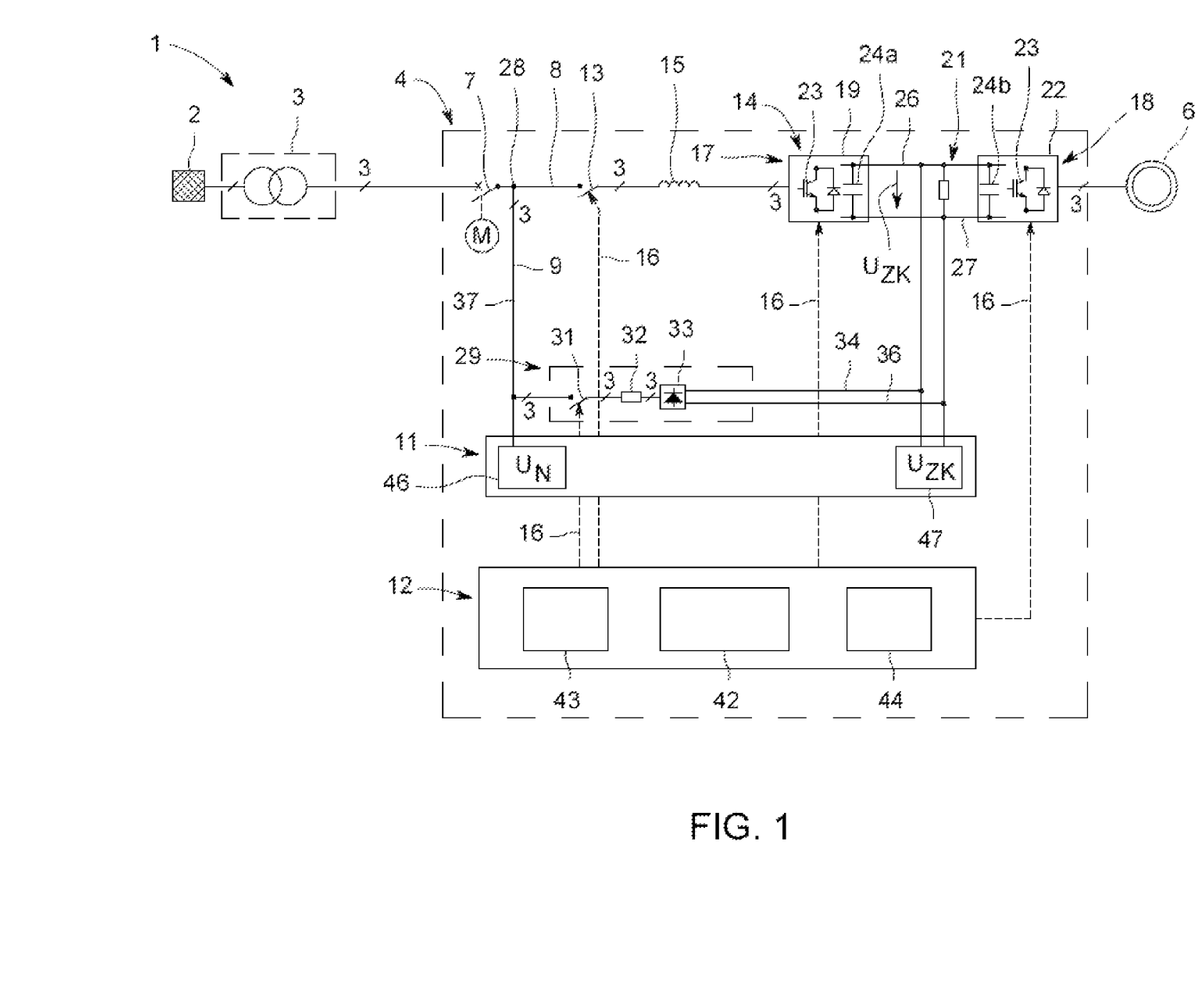
FIG. 1 illustrates an exemplary system comprising a converter for coupling an electrical power grid with an electrical machine illustrating an exemplary application of the invention in the form of a simplified block diagram.

FIG. 1 shows, in a simplified representation, a system 1, which is suitable in particular for supplying machines for example, drive motors, generators or the like, but also for other applications for example, medium or high-voltage direct current power distribution systems for electrical energy transmission, isolated grid systems or the like. System 1 here comprises an exemplary three-phase AC voltage source 2, which can in particular be an electrical power grid or wind power plant, in principle also an alternating current (AC) machine, an AC generator or the like, and which hereinafter is simply referred to as the supply grid or grid 2. A converter system 4, which is connected on one side to a load 6 such as an electrical motor or a generator, is connected to the grid 2 via a transformer 3. In the an application for wind power plants, the load 6 may represent a wind power plant generator and the converter system 4 may be a frequency converter system, which converts the AC grid voltage of the supply grid 2, which for example can be in the medium-voltage range of 10-20 kV, and which is lowered by the transformer 3 to a voltage level of, for example, 400-800 V, into an alternating voltage with a frequency that is suitable to supply a wind power plant generator 6. In other applications, the transformer can also be omitted. Likewise, depending on the application, the converter system 4 may be configured either for rectification only or for inversion only.

It should further be noted that the illustrated system 1 is shown as a three-phase system in which the respective phases are not shown separately but only together, as indicated by the slash with the numeral "3" above each of the three-phase lines in the system 1, shown by customary notation.

The converter system 4 is connected to the grid 2 through a main switching device 7, which is a circuit-breaker device, which makes it possible, if necessary, or in case of errors for example, high overload or short-circuit currents, to galvanically disconnect the converter system 4 from the grid 2.

The converter system 1, in the highly simplified representation of the embodiment shown, comprises substantially a first path or main current path 8, a second current path 9, a measuring device 11 and a control device 12. The first current path 8 extends between the circuit breaker device 7 and the load 6 and comprises a line disconnector 13, a frequency converter 14 and an interconnected grid choke 15. The line disconnector 13 is arranged between the main switching device 7 and the grid choke 15 to be able to disconnect the frequency converter 14 from the grid if needed or in case of error, even when the main switching device 7 is closed. While the main switching device 7 can be switched, for example, from a remote control center, the line disconnector 13 is controlled by the converter-internal control device 12, indicated by the control path 16 shown as a dashed arrow.

The frequency inverter 14 is used to convert the AC input voltage present at input 17 shown in FIG. 1 into an AC output voltage with fitting frequency and amplitude at its output 18 to supply the load 6. The frequency converter 14 can be divided modularly or functionally in a rectifier unit 19, which converts the AC input voltage into an intermediate circuit DC voltage UZK on a DC voltage intermediate circuit 21, and an inverter unit 22, which converts the intermediate circuit DC voltage UZK into the AC output voltage. The inverter unit 22 is connected in parallel with the rectifier unit 19 to the DC voltage intermediate circuit 21.

As shown in FIG. 1, the frequency converter 14 is a converter that comprises, in the forward direction, switchable power semiconductor devices and backward conductive valves. More precisely, a circuit arrangement of controllable elements 23, commonly power semiconductor switches such as bipolar transistors with insulated gate electrode (IGBTs), as illustrated, is provided in the rectifier unit 19 and the inverter unit 22 to perform the respective rectifier or inverter functions. Instead of IGBTs, also MOSFETs, gate turn-off thyristors (GTOs), IGC thyristors (integrated gate-commutated thyristors, IGCTs) and other comparable switchable electronic power devices can be used. The controllability of the power semiconductor switches 23, the rectifier unit 19 and the inverter unit 22 in FIG. 1 is indicated by the control paths 16 shown as dashed arrows, which point from the control device 12 to the units 19, 22.

Different arrangements and topologies for the rectifier, inverter and frequency converter circuits are known in the prior art, for example single-phase to multiphase, single-stage to multistage converter configurations, which can be used here and in many applications. Just as an example, reference is made to well-known and here usable multipoint converters in the "neutral point clamped" (NPC) topology, the "neutral point piloted" (NPP) topology or modular multilevel converters (MMC or M2C), which comprise, in every phase branch, a number of submodules, each of which is formed by a half or full bridge circuit or another circuit of controllable power semiconductor switches.

As further shown in FIG. 1, the rectifier unit 19 and the inverter unit 22 comprise associated intermediate circuit capacitors 24a or 24b, which define the DC voltage intermediate circuit 21. The intermediate circuit capacitor 24a is connected at the output of the rectifier unit 19 between a positive and a negative DC voltage line 26, 27 of the DC voltage intermediate circuit 21, while the intermediate circuit capacitor 24b of the inverter unit 22 is connected in parallel to the intermediate circuit capacitor 24a at the input of the inverter unit 22 to its circuit arrangement. The intermediate circuit capacitors 24a, 24b are shown separately in the modular design shown, but can be grouped into a single intermediate circuit capacitor 24. In particular, for the high voltage levels provided here, each intermediate circuit capacitor 24a, 24b comprises a series connection and, where appropriate, a parallel circuit of a plurality of electrolytic capacitors, which are connected together to produce the required dielectric strength and storage capacity. Likewise, such series and/or parallel connections of electrolytic capacitors are hereinafter referred to as an intermediate circuit capacitor 24.

The second current path 9 runs from a connection point 28 between the main switching device 7 and the line disconnector 13 of the first current path 8 to the DC voltage intermediate circuit 21. The second current path 9 comprises a precharging circuit 29, which is used to precharge the intermediate circuit capacitor 24 to the required DC voltage level before connecting the frequency inverter 14 to the grid 2, to avoid high transient switch-on currents, which could otherwise result in the discharging of the intermediate circuit capacitor 24.

The precharging circuit 29 comprises a switching device 31, a precharging resistor 32 and an uncontrolled rectifier circuit 33, which are connected in series on the second current path 9. The rectifier circuit 33 is connected on the output side via a first connection line 34 with the positive DC voltage line 26 of the DC voltage intermediate circuit 21, and via a second connection line 36 with the negative DC voltage line 27.

Figure 2:
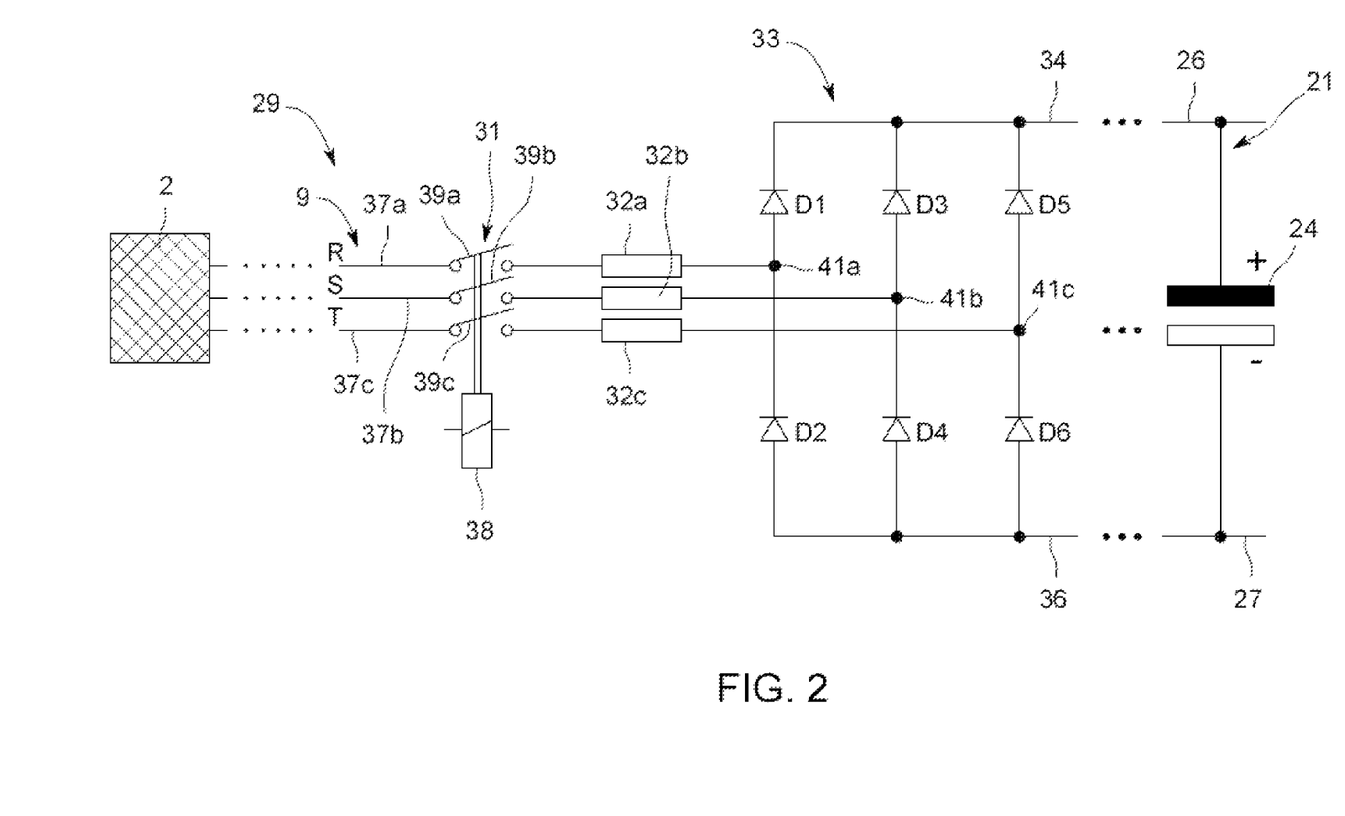
FIG. 2 shows an existing precharging circuit for precharging an intermediate circuit capacitor of the converter used in system 1 according to FIG. 1, shown in a simplified representation and in greater detail.

The precharging circuit 29 is shown in greater detail in FIG. 2. The connection line 37 is shown, which connects the precharging circuit 29 with the connection point 28 and further with the grid 2. A contactor 38 is arranged in the three-phase connection line 37, which forms the switching device 31 and comprises switching contacts 39a-39c to interrupt or close all phase lines 37a-c of the connection line 37 simultaneously as required.

In the single phase lines 37a-c of the connection line 37, the resistors 32a-c are provided, which are inserted between the switching contacts 39a-39c of the contactor 38 and AC voltage connections 41a-c of the rectifier circuit 33 and form the precharging resistor 32 according to FIG. 1.

The uncontrolled rectifier circuit 33 is designed similar to a Graetz bridge, with diodes D1-D6 as converter valves. In the course of this, a pair of rectifier diodes D1 and D2, D3 and D4 or D5 and D6 is arranged, each in series, between the first and the second connection line 34, 36, in the flow direction to the first connection line 34, while the connection points of the series-connected rectifier diodes D1 and D2, D3 and D4 or D5 and D6 form the AC voltage connections 41a-c. The cathodes of the rectifier diodes D1, D3 and D5 are connected to each other and to the first connection line 34, while the anodes of the diodes D2, D4 and D6 are connected to each other and to the second connection line 36. The first and the second connection line 34, 36 are in turn connected to the positive or negative DC voltage line 26, 27 of the DC voltage intermediate circuit 21 and to the intermediate circuit capacitor 24, which is shown in FIG. 2 as an entire polarized electrolytic capacitor.

Again with reference to FIG. 1, the converter system further comprises a control device 12, which is provided to appropriately control the operation of the converter system 4 on the basis of the current operating conditions. For the sake of clarity, the control paths are indicated in FIG. 1 with dashed arrows 16 only in a few locations. In particular, the control device 12 appropriately controls the power semiconductor switches 23 of the frequency converter 14 to create, from the transformed grid voltage UN (hereinafter simply referred to as the grid voltage), a suitable AC output voltage to supply the load 6. The control device comprises suitable hardware, for example, one or a plurality of flexible printed circuitboards with a field-programmable gate array (FPGA), which can comprise the different electronic components, including a central processing unit (CPU). In FIG. 1, the hardware of the control device 12 is collectively referred to as function block with the reference sign 42.

In an embodiment, the control device 12 further comprises software or firmware, which is collectively shown as function block 43 in FIG. 1. The software can be executed by the CPU to perform the control functions.

In an embodiment, the control device 12 further comprises a storage, represented as function block 44, which is used to store programs and/or data, including parameters for the converter system 4, data collected during the operation of the converter system 4, etc. RAM memory, flash memory, hard drives, optical or magnetic storage media suitable for this purpose are well known in the prior art.

Although FIG. 1 shows different function blocks 42, 43, 44 for the hardware, the software and the storage of the control device 12, it is understood that the control device 12 can be entirely implemented in hardware, software, which can be executed on a microprocessor, microcontroller or the like, or as a combination of the two. The control device 12 can also be distributed to a plurality of control units, which are arranged in different locations in the converter system 4, to fulfill various part control functions. A part of the control device 12 of the converter system 4 can be remote and arranged externally.

The control device 12 controls the converter system 4 depending on preconfigured parameters and the current operating conditions. The latter are provided to the control device 12 by the measuring device 11, which is configured to detect the current operating conditions and to convert them into appropriate signals for the control device 12. The measuring device 11 here illustrates how it comprises a grid voltage detection device 46 and an intermediate circuit voltage detection device 47. The grid voltage detection device 46 detects the transformed mains voltage at the connection point between the first and the second current path 8, 9 or the input of the precharging circuit 29. The intermediate circuit voltage detection device 47 is connected to the positive and negative DC voltage lines 26, 27 of the DC voltage intermediate circuit 21 to detect their potentials and determine the intermediate circuit DC voltage UZK present between them.

Although this is not shown, the measuring device can also detect other operating parameters of the converter system 4, which can comprise currents and voltage potentials on the current paths 8, 9 or in branches of the frequency converter 14, the output voltage of the frequency converter 14 as well as other voltages and currents, to the extent that they are required for the monitoring and control of the operation of the converter system 4. These operating parameters are less relevant to an embodiment of the present invention.

The system 1 as described above works as follows:

If, after an operational standstill, the converter system 4 is to be brought back in operation again and the load 6 is supplied by the grid 2 via the frequency converter 14, the DC voltage intermediate circuit 21 must first be precharged to the respective nominal voltage. This is accomplished with the precharging circuit 29. It is assumed that the main switching device 7 is already in its closed position, while the line disconnector 13 is open or will be opened. By closing the switching device 31, thus actuating the contactor 38, the second current path 9 can be connected conductively. A charging current taken from the grid current then flows via the closed switching device 31, the precharging resistor 32 and the uncontrolled rectifier circuit 33 to the DC voltage intermediate circuit 21, to precharge the intermediate circuit capacitor 24. In the precharging operation, the charging resistors 32a-c on the current path 9 limit the charging current to an appropriate maximum level at which the intermediate circuit capacitor 24 is not excessively heated and is not damaged. As soon as the intermediate circuit capacitor 24 has been charged up to a predetermined appropriate value for operation, for example, up to the nominal voltage, the contactor 38 is actuated again to interrupt the second current path 9. This completes the precharging process. After subsequent closing of the line disconnector 13, the frequency converter 14 with the intermediate circuit capacitor 24 is then put on the supplying grid 2 directly and can be operated in the usual manner. By appropriate control, such as high-frequency pulse-width-modulated clocking of the power semiconductor switches 23 of the frequency converter 14, the AC grid voltage can then be converted into the AC output voltage for the supply of the load 6.

As already mentioned, the intermediate circuit capacitor 24 consists of one or a plurality of series-connected and/or parallel-connected electrolytic capacitors, whose anode electrode is made of a metal, for example, aluminum, on which, by anodic oxidation, also called formation, a uniform but extremely thin electrical insulating metal oxide layer, for example aluminum oxide, is generated as a dielectric medium. An important parameter of electrolytic capacitors is their residual current behavior during recommissioning after storage. The leakage current is known as the residual current through the capacitor, which, shortly after applying a direct voltage, is still relatively high and, after prolonged periods of use, drops to a lower value, known as the operating leakage current. For the evaluation of the residual current behavior, the leakage current value is generally used, which, after five minutes' application of a direct voltage, is still flowing as a leakage current through the capacitor.

The dielectric medium of an electrolytic capacitor, if not used for a prolonged period of time, becomes damaged as a result of the degeneration of oxide, so that its insulating properties worsen. In other words, the DC conductivity of the oxide increases, which can cause an electrolytic capacitor, if not used for a longer period of time, when a direct voltage is applied, to carry an excessive leakage current, or overheat and be destroyed.

Figure 3:
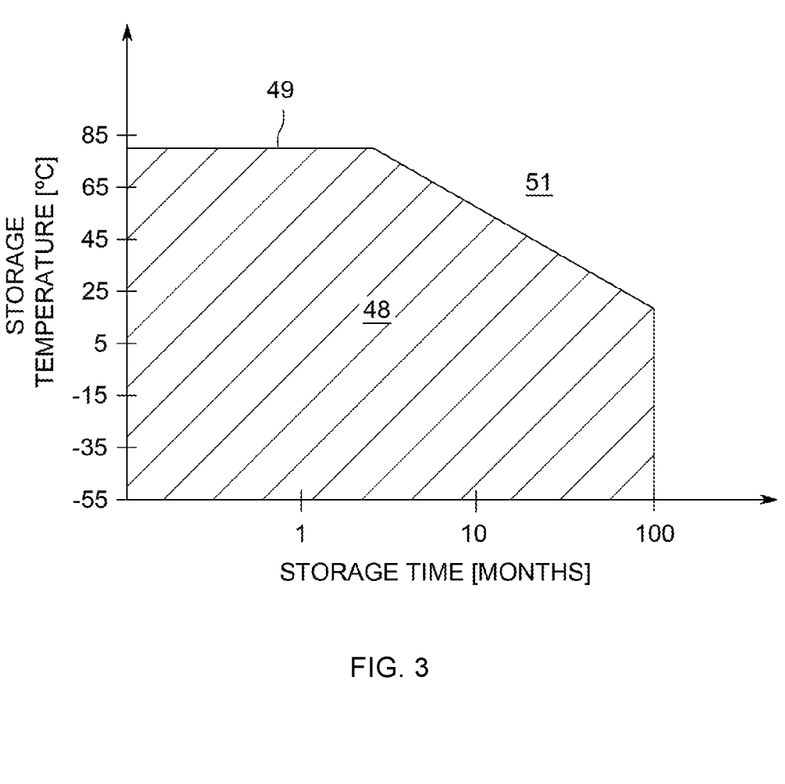
FIG. 3 shows a graphical representation illustrating the storability of an exemplary electrolytic capacitor depending on the storage temperature.

FIG. 3 illustrates the storability of an electrolytic capacitor of an exemplary selected type on the basis of a relationship between the storage time and storage temperature. It is understood that the time and temperature specifications given here are exemplary and type-specific and may differ from those for other electrolytic capacitor types. However, FIG. 3 shows the general relationship, according to which the insulating properties of an electrolytic capacitor generally worsen with increasing storage time and increasing storage temperature. An area 48, which is surrounded by a limit characteristic curve 49, identifies the area in which the insulating properties of an electrolytic capacitor are adequate, and its leakage current is within predetermined permissible limits. That is, in this area, the electrolytic capacitor can be put back into operation at nominal values without excessive risk of damage to the electrolytic capacitor. In the area 51 outside the limit characteristic curve 49, the insulating properties of an electrolytic capacitor are no longer adequate or the leakage current is outside of predetermined permissible limits, so that there is a high risk that the electrolytic capacitor could be damaged or destroyed when operation is restarted.

To prevent this, it is necessary to repeat the forming process under direct voltage, in order to repair the electrolytic capacitor after prolonged non-use and to build up the oxide layer again. Such a repetition of the forming process (reformation) must be gentle and happen at a slow rate, otherwise, in case of a greater degeneration of the oxide, a high reformation current can flow, which can also lead to damage to the electrolytic capacitor.

In applications of converters in which electrolytic capacitors are used for an intermediate circuit capacitor, for example, the intermediate circuit capacitor 24 of the frequency converter 14 of FIG. 1, it is customary to perform a reformation with a special reformation device or a special reformation circuit, which is connected to the intermediate circuit to reform the electrolytic capacitors of the intermediate circuit. For this purpose, a skilled maintenance technician must go to the location of the converter system, remove the converter from the grid with the line disconnector, for example the circuit breaker 13 in FIG. 1, whereby he may be required to leave a control center to open the main switching device 7 to ensure the reliable galvanic disconnection of the converter system 4 from the grid 2. The maintenance technician must also ensure, through measurements at different points in the system, that the lines of the system 4 are not energized and conduct no current. He must also ensure that the intermediate circuit capacitor 14 is discharged or will be discharged, in order to prevent any hazards when connecting the special reformation device. Only then can the special reformation device be connected to the DC voltage intermediate circuit 21. If the reformation device does not have its own voltage supply, it must be connected to an appropriate auxiliary voltage supply of the system 4, if present. Only then can the reformation process be performed. All this is laborious, time-consuming and increases the maintenance costs. Furthermore, there is the risk that, due to an error by the maintenance technicians during the preparatory protective measures or the reformation process, their health or the functioning of the converter system can be jeopardized.

In order to prevent this, the use of a precharging circuit for the converter according to an embodiment proposed, for example, the precharging circuit 29 in the converter system 4 according to FIG. 1, for the reformation, if required, of an electrolytic capacitor of the intermediate circuit capacitor, for example, the intermediate circuit capacitor 24 in FIG. 1. In particular, a method for the reformation of an intermediate circuit capacitor formed from at least one electrolytic capacitor, as illustrated in a highly simplified schematic diagram in FIG. 4.

Figure 4:
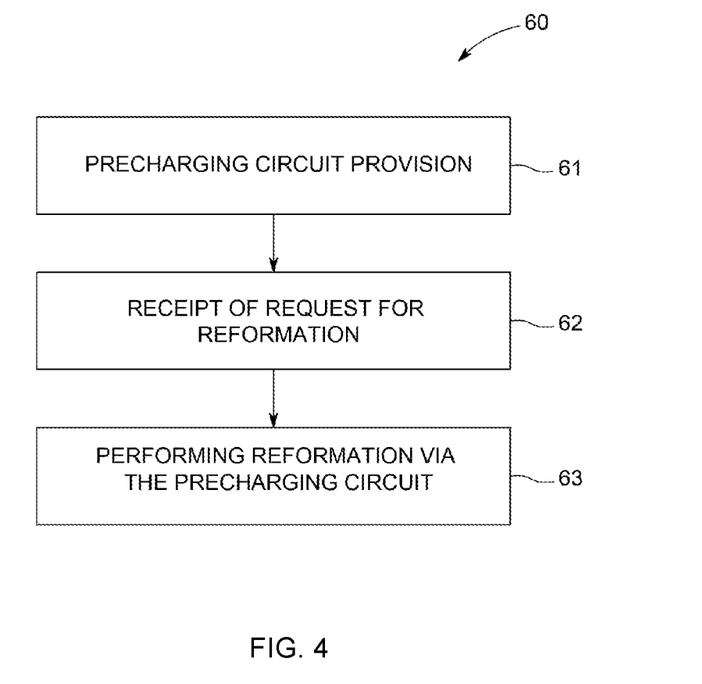
FIG. 4 is a highly simplified schematic flowchart of a reformation process for the reformation of electrolytic capacitors in a converter, for example the one of FIG. 1 in a highly simplified schematic diagram.

The method 60 in FIG. 4 begins with the step 61, according to which a precharging circuit for the converter is provided, for example, the precharging circuit 29 for the frequency converter 14 in FIG. 1, which is configured to precharge an intermediate circuit capacitor of the converter, for example, the intermediate circuit capacitor 24, before the converter, for example, after prolonged storage or non-use is connected again to the supply grid 2. The precharging circuit comprises a switching device, for example 31, which is arranged on a current path, for example 9, between the supply grid and the intermediate circuit capacitor. Such a precharging circuit already exists in many conventional converter systems and can now be used to fulfill the additional function of the reformation.

The method 60 in step 61 further comprises a receipt of a request for the reformation of the electrolytic capacitor(s) of the intermediate circuit capacitor of the converter. Such a request can be provided, for example, by an operator, for example, a maintenance technician, after a maintenance measure has been taken or after a replacement of one or a plurality of electrolytic capacitors via a switch or another input interface provided for this purpose.

In embodiments, such a request signal is, however, provided by the internal control device, for example, the control device 12 of conversion system 4. For example, the control device can, based on the system software, the stored parameters and/or the measurement signals, detect conditions that indicate a need for a reformation of the intermediate circuit capacitor, to subsequently start the reformation process automatically, i.e. by self-activation, without intervention by a user.

In particular, the control device, for example 12, can, for example, detect that the converter was out of operation for a period of time greater than a predetermined first period of time Tth1, so that the intermediate circuit capacitor has received no power. The first period of time Tth1 can be determined according to a suitable time threshold that is dependent on the particular application and can be determined empirically. In general, Tth1 can correspond to one or several hours or one or several days.

The control device, for example 12, additionally or alternatively, can also detect that an electrolytic capacitor forming the intermediate circuit capacitor has been replaced. For example, the maintenance technician can parameterize the converter system accordingly when replacing an electrolytic capacitor, in order to record the replacement. If an entire circuitboard with electrolytic capacitors is replaced, the control device, if necessary, by querying an identification of the circuitboard, can determine that it has been replaced.

In an embodiment, the control device, for example 12, can, by means of the measuring device, for example 11, monitor a precharging process for precharging the intermediate circuit capacitor, for example 14, by means of the precharging circuit, for example 29, before it is connected to the grid, and use it for detecting a need for the reformation. If it is detected that the precharging process is not completed within a period of time, which exceeds a predetermined second period of time Tth2, it can be seen as an indication that the insulating properties of the electrolytic capacitors have deteriorated and they require reformation. The second period of time Tth2 can be empirically determined and suitably set depending on the application. It can be in the range of a few minutes up to an hour or several hours.

Once a request for the reformation of the intermediate circuit capacitor has been received at step 62, the reformation of the intermediate circuit capacitor, for example 24, can be started in step 63 via the precharging circuit, for example 29. For this purpose, the switching device, for example 31, of the precharging circuit is switched to a closed state, in an embodiment, the by a control device, for example 12, or alternatively by an operator to activate the precharging circuit. Subsequently, a reformation current from the supply grid, for example 2, can flow through the closed switching device, for example 31, the precharging resistor, for example 32, and the rectifier circuit, for example 33, to the intermediate circuit capacitor, for example 24, in order to reform it via the precharging circuit. The precharging circuit, in addition to being used for precharging, can also be used for the reformation of the electrolytic capacitors to build up and regenerate the oxide layer again.

The method according to an embodiment requires little or even no intervention on the part of the operator. There is no need to send competent and experienced maintenance personnel with special reformation devices to the location of the converter systems. The expense associated with the reformation is extremely low and the corresponding expenses can be reduced to a minimum. Electrical access to the DC voltage intermediate circuit is not required. In addition, the risks associated with conventional reformation of electrolytic capacitors in converters are eliminated.

Figure 5:
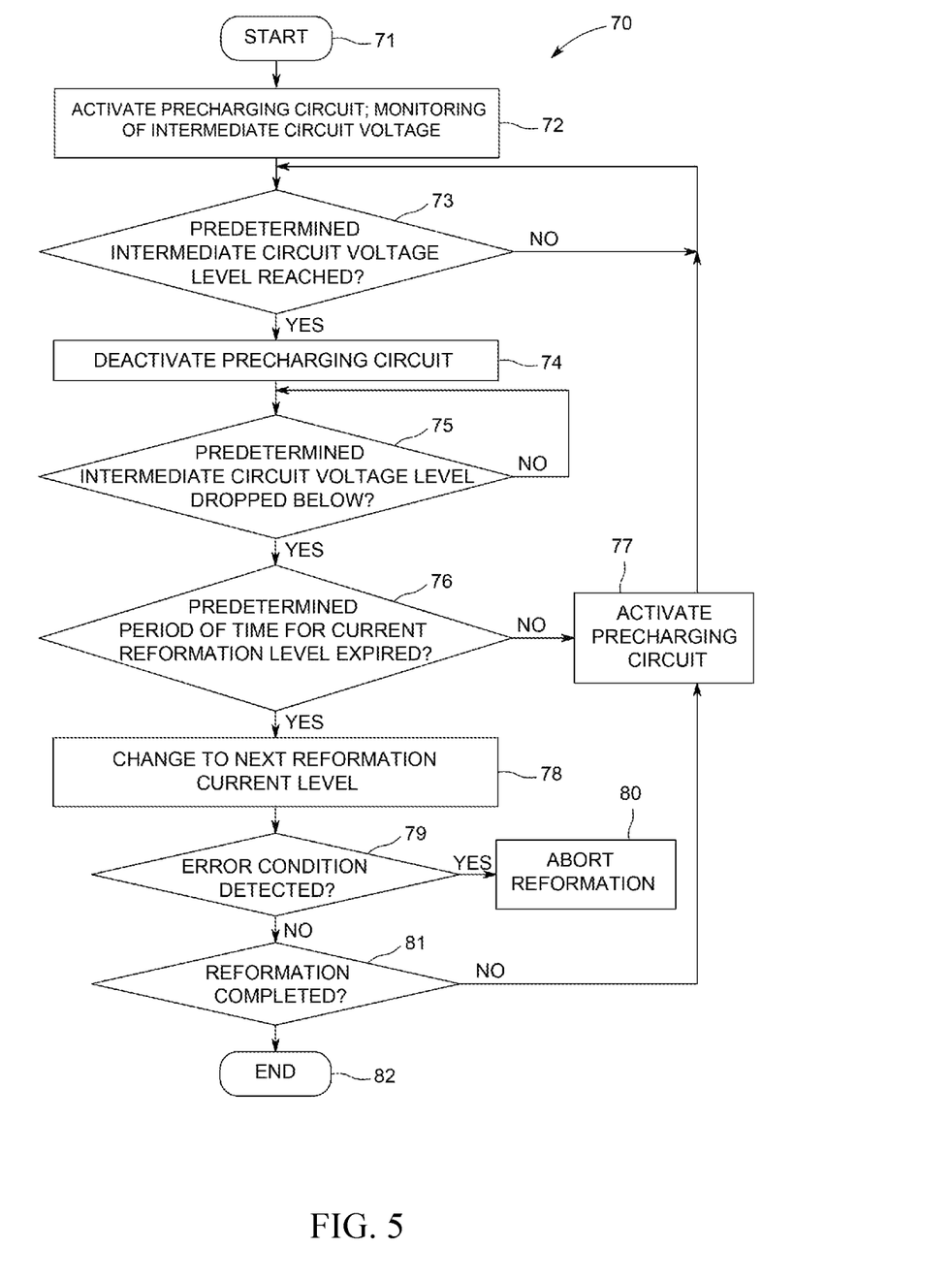
FIG. 5 is a flowchart of a reformation process, which can be performed in the implementation of the reformation process of FIG. 3, shown in a simplified representation.

FIG. 5 shows a simplified flowchart, which illustrates the reformation process via the precharging circuit, for example 29 in FIG. 1, after the activation in step 63 of the method 60 according to FIG. 4 in greater detail.

The reformation process is started in step 71.

For this purpose, the precharging circuit, for example 29, is activated in step 72 by closing the switching device, for example 31, as described above. In addition, a monitoring of the voltage level and, if necessary, the voltage rise of the intermediate circuit DC voltage UZK and, if necessary, the monitoring of the grid voltage UN at the input of the precharging circuit is started.

In step 73, it is checked whether the intermediate circuit DC voltage UZK has reached a predetermined level. If this is not the case, the reformation via the precharging circuit is continued and the intermediate circuit DC voltage level continues to be monitored.

As soon as the predetermined intermediate circuit DC voltage level has been reached (yes in step 73), the precharging circuit is deactivated in step 74. In this time, which can be set at 5 minutes or more, the electrolytic capacitors can, as a result of their leakage current, reduce the charge. The leakage current can be monitored based on the quantity of the intermediate circuit DC voltage UZK to assess the residual current behavior.

In step 75, it is checked whether a predetermined intermediate circuit DC voltage level has been dropped below. If this is not the case, the precharging circuit can continue, at least for predetermined period of time, to be deactivated to allow for further reduction of the intermediate circuit capacitor charge.

If the predetermined intermediate circuit DC voltage level has dropped below (yes in step 75), it is verified, in step 76, whether a predetermined period of time has expired for the current voltage level of the reformation voltage. If this is not the case, the precharging circuit is activated again in step 77 and we return to step 73.

Otherwise (yes in step 76), step 78 is started, which changes to the next reformation voltage level.

The reformation voltage UR, which is applied via the precharging circuit, for example 29, to the intermediate circuit, for example 12, is determined by the grid voltage, by the precharging resistor, for example 32, and by the voltage drops in the second current path, for example 9, including the rectifier circuit, for example 33, and the current intermediate circuit voltage UZK. The reformation voltage UR should be within the permissible limits specified by the manufacturer of the electrolytic capacitor type. Likewise, the reformation current should adhere to the manufacturer's specifications. These manufacturer's specifications can be, for example, in the form of a lookup table or similar, for example in storage 44 of the system 4 according to FIG. 1, or integrated into the software or firmware 43. The control device, for example 12, can then, if necessary, access the stored manufacturer's specifications to suitably set the reformation voltage and the reformation current, so that the specified limits are observed.

A suitable reformation voltage UR can be achieved, for example, by appropriate clocking of the switching device, for example 31, of the precharging circuit, for example 29, so that, on average, the desired reformation voltage $\overline{UR}$ results. This is exemplified in FIG. 6, which shows a sequence of the average reformation voltage $\overline{UR}$ over the course of time and exemplary associated duty cycles for the switching device, for example 31.

Figure 6:
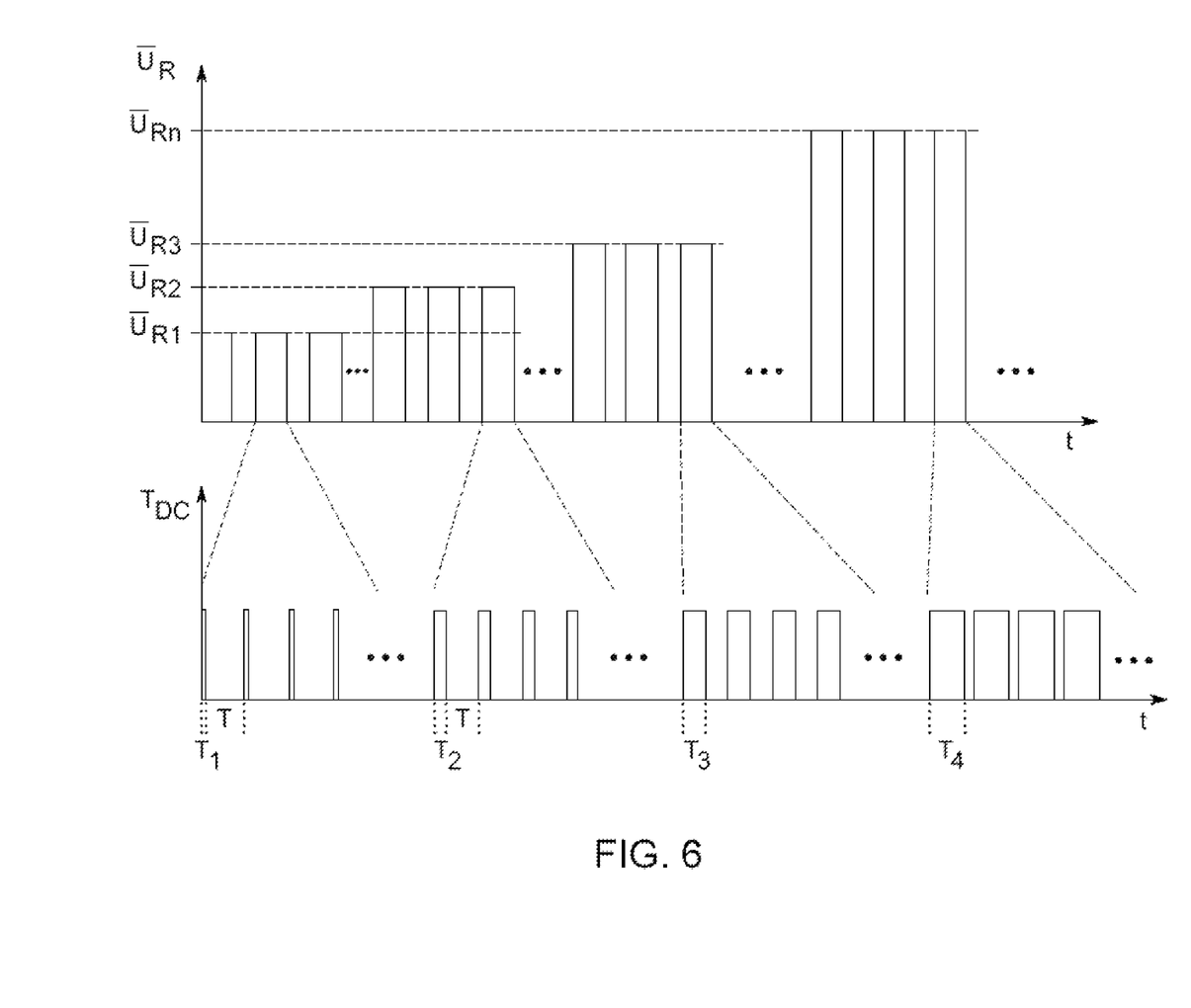
FIG. 6 is a highly simplified time flowchart illustrating the reformation process of FIG. 4.

As shown in FIG. 6, if a first average reformation voltage level $\overline{UR1}$ is desired, a first duty cycle, T1/T is selected, at which the switching device, for example 31, is switched on for the period of time T1 within the period T. If a higher average reformation voltage level $\overline{UR2}$, $\overline{UR3}$, ... $\overline{URn}$ is desired, the duty cycle for the switching device, for example 31, is increased progressively in that the switch-on duration T2, T3, Tn is extended within the period T. In this way, the desired reformation voltage $\overline{UR}$ and the desired reformation current can be suitably set.

Returning to FIG. 5, in step 78, a voltage level of the average reformation voltage, which is applied to the DC voltage intermediate circuit, for example from the average voltage $\overline{UR1}$, is changed to the next higher average reformation voltage level, for example $\overline{UR2}$ (or from $\overline{UR2}$ to $\overline{UR3}$, ... from UR(n−1) to $\overline{URn}$). This takes into account that, during the reformation, the intermediate circuit capacitor 24 is increasingly repaired and the intermediate circuit becomes increasingly charged, so that an increasingly high reformation voltage is necessary and suitable.

After step 78, we can proceed with the optional step 79, in which it is verified whether error conditions exist. If, for example, it is determined that the reformation process takes longer than a third period Tth3, which can be specified in such a way that a reformation process surely should be finished within this period of time Tth3, this indicates that one or a plurality of the electrolytic capacitors in the intermediate circuit capacitor are damaged, or that a fault is present in the precharging circuit or in the frequency converter, for example, a short-circuit of the power semiconductor switches. In this case, the reformation process can be aborted in step 80. In an embodiment, an error message, such as a visual or acoustic message, can be output automatically on a display, not further shown here, of the converter system or transmitted as an error message via a wireless, wired or telephone network to a remote control center. An error can also be detected if the intermediate circuit voltage UZK over the intermediate circuit capacitor, for example 14, does not increase sufficiently or does not increase sufficiently quickly during the reformation process. This may indicate strong leakage currents, which can be caused, for example, by damage to one or a plurality of the electrolytic capacitors.

If no error conditions are detected (no in step 79), in step 81 it is verified whether the reformation process can be considered to be completed. For example, on the basis of the intermediate circuit DC voltage UZK or its drop by the deactivated precharging circuit, it can be determined that the leakage current is below a certain maximum permissible limit value and thus the capacitors have been regenerated sufficiently.

If, in step 81, it is determined that the reformation process has not yet been completed, we return to step 77 by reactivating the precharging circuit, and then proceed with step 73.

If it is determined that the reformation process has been completed (yes in step 81), the reformation process will be completed in step 82.

If the reformation process 70 has been completed, then the control device, for example 12, in FIG. 1 can optionally continue the precharging process, before the converter, for example the frequency converter 14 in FIG. 1, is connected to the grid, for example 2. The precharging process is shortened, or can even be omitted, if the intermediate circuit capacitor has already been charged up to a voltage value that is sufficient for the operation during the reformation process.

In the context of the invention, numerous modifications are possible to the method and converter. Whereas the illustrated reformation process in FIG. 5, depending on the application and requirements, can also be performed with modifications. In a particularly simple embodiment, for example, a predetermined average reformation voltage UR can be set via the clocking of the switching device, for example 31, and applied over a fixed period of time to the intermediate circuit capacitor, for example 24, to perform the reformation. On the expiry of the specified period of time, the reformation process is terminated automatically.

In another embodiment, the applied average reformation voltage $\overline{U}R$ can follow a reformation curve, which can be specified or suggested by the manufacturer of the electrolytic capacitors. The reformation curve can differ from the gradual increase of the reformation voltage as illustrated in FIGS. 5 and 6.

Although a certain precharging circuit 29 for precharging the intermediate circuit capacitor 24 in system 1 according to FIG. 1 is illustrated here, the precharging circuit used can differ from the one illustrated. For example, the rectifier circuit 33 of the precharging circuit 29 could also be controlled, i.e. could have controllable switching elements. The precharging circuit could also be connected differently than illustrated in FIG. 1, but by simply closing a switching device it should allow the use of a current derived from an AC voltage source or a supply grid for precharging an intermediate circuit capacitor as well as for the reformation of the electrolytic capacitors comprising it.

Furthermore, FIG. 1 shows a converter system 4 with a frequency converter 14, but it should be understood that the method according to the invention could in an embodiment also be applied to other converter systems, which comprise only a rectifier arrangement or an inverter arrangement with an intermediate circuit, which is formed by at least one electrolytic capacitor.

According to one aspect of the invention, a precharging circuit for precharging an intermediate circuit capacitor 24 of a converter 14 formed from at least one electrolytic capacitor using a grid current from a supply grid 2 connected before the converter 14 to the supply grid 2 is also used for the reformation of at least one electrolytic capacitor of the intermediate circuit capacitor 24. According to a further aspect of the invention, a method is created for the reformation of an intermediate circuit capacitor 24 of a converter 14 formed from at least one electrolytic capacitor, which is connected to a supply grid 2, using a precharging circuit 29. According to yet another aspect of the invention, a converter 14 is created for converting an AC grid voltage into a direct voltage or vice versa with a device for the reformation of electrolytic capacitors of an intermediate circuit capacitor 24 of the converter 14 using an integrated precharging circuit 29 of the converter 14. Existing hardware can be used for the reformation of electrolytic capacitors in a converter, and the expense associated with the reformation can be minimized.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for the reformation of an intermediate circuit capacitor of a converter formed from at least one electrolytic capacitor connected to a supply grid, the method comprising:

providing a precharging circuit for the converter the precharging circuit (i) being configured to precharge the intermediate circuit capacitor of the converter using the grid current of the supply grid before the converter is connected to the supply grid, and (ii) comprising a switching device in a current path between the supply grid and the intermediate circuit capacitor;

wherein, the switching device is formed by a contactor device arranged in a three-phase connection line connecting the precharging circuit to the supply grid;

receiving a request for the reformation of the intermediate circuit capacitor; and switching the switching device to a closed state to allow a reformation current to flow from the supply grid through the closed switching device and the current path to the intermediate circuit capacitor in order to reform it via the precharging circuit.

2. The method according to claim 1, wherein the precharging circuit further comprises a precharging resistor, which is connected in series to the switching device in the current path between the supply grid and the intermediate circuit capacitor, and wherein the precharging resistor, during the reformation, limits the current flow through the current path to the intermediate circuit capacitor.

3. The method according to claim 1, wherein the precharging circuit further comprises a non-controlled rectifier circuit to convert the AC grid voltage of the supply grid into a direct voltage, wherein, during the reformation, the reformation voltage for the intermediate circuit capacitor is determined by the amount of the AC grid voltage, the control factor of the switching device and the leakage current of the intermediate circuit capacitor to be reformed.

4. The method according to claim 1, wherein the receipt of a request for reformation of the intermediate circuit capacitor comprises an output from a control device if conditions are detected that indicate the need for a reformation of the intermediate circuit capacitor, whereon the reformation process is started automatically.

5. The method according to claim 4, wherein reformation of the intermediate circuit capacitor occurs when the control device detects that the intermediate circuit capacitor has received no power for a period of time exceeding a predetermined first period of time.

6. The method according to claim 4, wherein reformation of the intermediate circuit capacitor occurs when the control device detects that at least one of the electrolytic capacitors forming the intermediate circuit capacitor has been replaced.

7. The method according to claim 4, reformation of the intermediate circuit capacitor occurs when the control device detects that a precharging process for precharging the intermediate circuit capacitor by means of the precharging circuit is not completed within a period of time that exceeds a predetermined second period of time.

8. The method according to claim 1, wherein receiving the request for reformation of the intermediate circuit capacitor comprises a receipt of an external request signal triggered by an operator.

9. The method according to claim 1, wherein the reformation process is controlled by taking into account a specification of the at least one electrolytic capacitor forming the intermediate circuit capacitor.

10. The method according to claim 1, wherein the switching device is clocked so that, on average, a desired reformation voltage on the intermediate circuit capacitor and/or a desired reformation current to the intermediate circuit capacitor results.

11. The method according to claim 1, wherein the switching device is clocked so that an average reformation voltage applied to the intermediate circuit capacitor follows a gradually increasing curve.

12. The method according to claim 1, wherein the switching device is clocked so that an average reformation voltage applied to the intermediate circuit capacitor is increased gradually, wherein, between each number of cycle times within one voltage level and/or between successive voltage levels of the average reformation voltage, the switching device is switched off for a predetermined period of time to interrupt a reformation current to the intermediate circuit capacitor.

13. The method according to claim 1, wherein, during the reformation process, the intermediate circuit voltage is detected via the intermediate circuit capacitor and/or the grid voltage of the supply grid to monitor and control the progress of the reformation process.

14. The method according to claim 1, wherein, if the reformation process takes longer than a predefinable third period of time (ii) the intermediate circuit voltage via the intermediate circuit capacitor is insufficient during the reformation process or (iii) the intermediate circuit voltage does not increase sufficiently fast, the reformation process is aborted and an error message is transmitted.

15. The method according to claim 1, wherein, after determining that the formation process is complete, the switching device is switched to an open state.

16. The method according to claim 1, wherein, after determining a successfully completed reformation process and before connecting the converter to the supply grid, a precharging process for the intermediate circuit capacitor is performed.

17. The method according to claim 1, wherein the converter is a frequency converter configured to exchange electrical energy between an AC voltage supply grid and an electrical machine.

18. The use of a precharging circuit for a converter configured to precharge an intermediate circuit capacitor of the converter formed from at least one electrolytic capacitor using a grid current from a supply grid before the converter is connected to the supply grid for the reformation of at least one electrolytic capacitor of the intermediate circuit capacitor;
  wherein, the precharging circuit comprises a switching device in a current path between the supply grid and the intermediate circuit capacitor; and
  wherein, the switching device is formed by a contactor device arranged in a three-phase connection line connecting the precharging circuit to the supply grid; and
  wherein, the switching device is configured to switch to a closed state to allow a reformation current to flow from the supply grid through the closed switching device and the current path to the intermediate circuit capacitor in order to reform it via the precharging circuit.

19. A converter for converting a AC grid voltage into a direct voltage or vice versa, comprising:
  a circuit arrangement with controllable switching elements;
  a DC voltage intermediate circuit arranged on the DC voltage side of the circuit and connected in parallel with it, wherein the DC voltage intermediate circuit comprises an intermediate circuit capacitor formed by one electrolytic capacitor or a plurality of interconnected electrolytic capacitors;
  a precharging circuit (i) being configured to precharge the intermediate circuit capacitor of the converter using a grid current of the supply grid before the converter is connected to the supply grid and (ii) comprising a switching device in a current path between the supply grid and the intermediate circuit capacitor;
  wherein the switching device is formed by a contactor device arranged in a three-phase connection line connecting the precharging circuit to the supply grid; and
  a control device for controlling the operation of the converter depending on the operating conditions.

20. The converter according to claim 19, wherein the converter is a frequency converter for operating an electrical machine on an electrical AC voltage supply grid and comprises a rectifier unit and an inverter unit coupled to each other via the DC voltage intermediate circuit with the intermediate circuit capacitor, and wherein the frequency converter is suitable for supplying a wind power plant generator.

* * * * *